United States Patent
Eaton et al.

(10) Patent No.: US 7,740,206 B2
(45) Date of Patent: Jun. 22, 2010

(54) TRANSLATING ACTIVE GURNEY FLAP TO ALLEVIATE AIRCRAFT WAKE VORTEX HAZARD

(75) Inventors: John K. Eaton, Stanford, CA (US); Claude Matalanis, Tolland, CT (US)

(73) Assignee: The Board of Trustees of the Leland Stanford Junior University, Palo Alto, CA (US)

(*) Notice: Subject to any disclaimer, the term of this patent is extended or adjusted under 35 U.S.C. 154(b) by 798 days.

(21) Appl. No.: 11/707,552

(22) Filed: Feb. 15, 2007

(65) Prior Publication Data

US 2009/0321582 A1    Dec. 31, 2009

Related U.S. Application Data

(60) Provisional application No. 60/791,787, filed on Apr. 13, 2006.

(51) Int. Cl.
    *B64C 9/00* (2006.01)
(52) U.S. Cl. .................. 244/201; 244/215
(58) Field of Classification Search ............ 244/199.1, 244/201, 215, 216, 217, 82, 99.14, 99.13, 244/199.3, 199.4
See application file for complete search history.

(56) References Cited

U.S. PATENT DOCUMENTS

| | | | |
|---|---|---|---|
| 3,984,070 | A | 10/1976 | Patterson, Jr. |
| 4,477,042 | A | 10/1984 | Griswold, II |
| 4,890,803 | A * | 1/1990 | Smith ............ 244/219 |
| 5,088,665 | A | 2/1992 | Vijgen et al. |
| 5,230,486 | A | 7/1993 | Patterson, Jr. |
| 5,294,080 | A | 3/1994 | Ross |
| 5,806,807 | A | 9/1998 | Haney |
| 6,042,059 | A | 3/2000 | Bilanin et al. |
| 6,082,679 | A | 7/2000 | Crouch et al. |

(Continued)

FOREIGN PATENT DOCUMENTS

GB            404269            1/1934

(Continued)

OTHER PUBLICATIONS

Bilanin et al. "Aircraft Wake Dissipation by Sinusoidal Instability and Vortex Breakdown" (1973) AIAA 11th Aerospace Sciences Meeting, paper 73-107, pp. 1-11.

(Continued)

*Primary Examiner*—Timothy D Collins
*Assistant Examiner*—Michael Kreiner
(74) *Attorney, Agent, or Firm*—Lumen Patent Firm

(57) ABSTRACT

A wake vortex alleviator is provided. The wake vortex alleviator produces rapid variations in the position of vortices emanating from aerodynamic surfaces by using an active flap that moves span-wise back and forth along the outboard section of the surface. Rapidly moving the flap back and forth in a slot at an appropriate frequency will cause the vortex to oscillate, resulting in interaction between other vortices and subsequent destruction much earlier than it would occur naturally. The slot is positioned near the aerodynamic surface trailing edge and generally transverse to a chord line of the aerodynamic surface. The flap can be moved using a variety of actuators to position, translate and stow the flap. The oscillation frequency and position are guided by information feedback according variations in lift in the aerodynamic surface, such as wind gusts. The flaps can control yaw, roll and pitch of the aerodynamic surface.

22 Claims, 5 Drawing Sheets

U.S. PATENT DOCUMENTS 6,375,127 B1    4/2002   Appa
6,394,397 B1    5/2002   Ngo et al.
6,641,089 B2   11/2003   Schwetzler et al.
6,719,246 B2    4/2004   Corjon et al.
7,028,954 B2    4/2006   Van Dam et al.

OTHER PUBLICATIONS

Crouch et al "Active-Control System for Breakup of Airplane Trailing Vortices" (2001) AIAA Journal, vol. 39, No. 12, pp. 2374-2381.

Solovitz et al. "Spanwise Response Variation for Partial-Span Gurney-Type Flaps" (2004) AIAA Journal, vol. 42, No. 8 pp. 1640-1643.

Solovitz et al. "Dynamic Flow Response Due to Motion of Partial-Span Gurney-Type Flaps" (2004) AIAA Journal, vol. 42, No. 9 pp. 1729-1736.

* cited by examiner (d)

(e)

TRANSLATING ACTIVE GURNEY FLAP TO ALLEVIATE AIRCRAFT WAKE VORTEX HAZARD

CROSS-REFERENCE TO RELATED APPLICATIONS

This application is cross-referenced to and claims the benefit from U.S. Provisional Patent Application 60/791,787 filed Apr. 13, 2006, which is hereby incorporated by reference.

FIELD OF THE INVENTION

The invention relates generally to flaps on aircraft. More particularly, the invention relates to an active translating partial span flap to produce rapid variations in the position of vortices for causing early destruction of wake vortices thereby reducing the wake vortex turbulence hazard.

BACKGROUND

The goal in today's aviation market is to improve airport capacity. Heavy aircraft produce very strong vortices when flying at low speed during takeoff and landing, thus creating potential hazards for following aircraft. Consequently, the wake vortex hazard has become the limiting factor in airport capacity.

Flying aircraft leave a system of vortices trailing behind as a necessary consequence of the generation of lift. For large transport aircraft, these vortices typically coalesce into a pair of counter-rotating vortices. The strength of the vortices is proportional to the weight of the aircraft and inversely proportional to the aircraft speed. Therefore, a heavy aircraft produces very strong vortices when it is flying at low speed during takeoff and landing. Under turbulent atmospheric conditions, trailing vortices are diffused rapidly and pose little hazard. However, when the atmosphere is calm or weakly turbulent the vortices can pose a major hazard. The vortices are strong enough that they can cause loss of control and/or physical damage to following aircraft, where several accidents have been attributed to the wake vortex hazard. Currently, to manage this problem large longitudinal spacing between aircraft and large lateral spacing between parallel runways are required to avoid any chance of a wake vortex being encountered by a trailing aircraft. As a result of these rules, the wake vortex hazard has become the limiting factor in airport capacity.

Two counter-rotating vortices eventually interact with one another, causing them to link and destroy one another. This process is caused by instabilities and is well known. The problem is that these instabilities build up slowly, and under natural conditions it takes a long time and distance for the instability to lead to vortex destruction.

The concept of causing early wingtip vortex destruction by exciting instabilities is of paramount interest. Investigation of several different "perturbators" that produce disturbances in the vortex core has been documented. A Kármán vortex street occurs naturally whenever flow passes over a bluff body at sufficiently high Reynolds number. The Kármán vortex street is a repeating pattern of swirling vortices caused by the unsteady separation of flow over bluff bodies. A bluff body such as a cylinder or a flat plate will periodically shed alternating sign vortices. When a vortex is shed, an unsymmetrical flow pattern forms around the wing, which therefore changes the pressure distribution. This means that the alternate shedding of vortices can create periodic forces on the wing surface, causing it to vibrate. If the vortex shedding frequency is similar to the natural frequency of a wing, it causes resonance. With aircraft this periodic force is highly undesirable. These vortices are perpendicular to the flow direction, and thus also perpendicular to the wingtip vortex. Passive, fixed-position vortex shedding perturbators mounted near the trailing edge of wings, such as a bluff body or a transverse jet, that are positioned in the flow have been studied to determine if the Kármán vortex street will be embedded in the tip-vortex core to cause periodic perturbations to the tip vortex, thus exciting natural instabilities of the vortex system for early destruction. By choosing the size of the bluff body correctly, the perturbations will be the correct wavelength to excite instability in the tip vortex core to make the vortex core diameter larger. These perturbators attached to wings that have two or more lifting surfaces were determined to have a high parasitic drag when deployed and limited to exploiting instability of only a single vortex core, causing that core to increase in size. Having a bluff body protrude into the flow to induce disturbances will cause two problems. First, it will increase the drag of the wing significantly. This may be of less concern if it is intended to be deployed only during takeoff and landing. However, takeoff requires maximum engine thrust and is hindered by the added drag. Secondly, by its very nature the bluff body perturbator will cause vibrations of the wing and the entire aircraft, which may have similar unwanted resonance consequences as mentioned above.

Accordingly, there is a strong need to develop new ways to minimize wake vortex hazards for reducing the large longitudinal spacing between aircraft and large lateral spacing between parallel runways to avoid any chance of wake vortices being encountered by trailing aircraft and thus improve airport capacity What is needed is a way to produce rapid variations in the position of each vortex. Rapid variations will cause the vortex emanating from each wing to oscillate resulting in interaction between the two vortices and subsequent destruction much earlier than it would occur naturally.

SUMMARY OF THE INVENTION

The present invention provides a wake vortex alleviator on an aerodynamic surface. The invention includes a translating flap integrated to a slot in the aerodynamic surface. The flap is positioned in air moving across the aerodynamic surface using an actuator for translating, positioning and stowing the flap. The slot is generally transverse to a chord line of the aerodynamic surface and positioned near a trailing edge of the aerodynamic surface. The flap translates along the slot to induce early destruction of the wake vortex created by the aerodynamic surface.

In one aspect of the invention, the flap may be on the low-pressure side or on the high-pressure side of the aerodynamic surface.

In one embodiment of the invention, the flap is a Gurney flap. In one aspect of the invention, the flap has a length that is up to ½ of a wing half span. In a further aspect, the flap has an effective height that varies along the slot, where the effective height may be up to 5-percent of a length of the chord line.

In a further aspect of the invention, the slot may be at least two times the length of the flap.

In another embodiment of the invention, the flap may have holes, slices or features cut there through.

In one aspect, the aerodynamic surface can be one or more lifting surfaces of a wing. The additional lifting surface may be a Fowler flap.

In one aspect of the invention, the slot may be a void in the aerodynamic surface. The void may be an open span between the trailing edge and a lifting surface deployed from the trailing edge. In another aspect, the void may be a space of air that is positioned away from the aerodynamic surface, where the actuator and flap are positioned in the aerodynamic surface and out of the air flow when the flap is stowed.

In a further aspect of the invention, the translation can be an oscillation along the slot. Additionally, the oscillation may be a response-oscillation actuated according to variations in lift in the aerodynamic surface, where the lift variations may be wind gusts.

According to one aspect of the invention, the trailing edge of the aerodynamic surface may be a sharp edge or a blunt edge.

In another aspect of the invention, the actuator is selected from a group of actuators that include a linear ball screw, a worm drive, a scotch yoke, a crank arm and a solenoid.

In another embodiment, the flap can be a pair of the flaps mounted on the aerodynamic surface located on each side of an aircraft. In one aspect, the flaps are mounted symmetrically on the aerodynamic surfaces located on each side of an aircraft.

In another aspect of the invention, the flap stowage includes a pivoting flap that rotates the flap into the slot and out of the airflow. Further, the flap stowage can be a hidden slot in a root of the aerodynamic surface, where the flap moves into the hidden slot and out of the airflow.

According to one aspect of the invention, the flap controls a yaw, a roll or a pitch of the aerodynamic surface.

In another aspect of the invention, the aerodynamic surface further comprises an extended flutter boundary.

Some key advantages of the current invention include minimizing wake vortex hazards and reducing the large longitudinal spacing between aircraft and large lateral spacing between parallel runways currently required to avoid any chance of wake vortices being encountered by following aircraft. This results in an improved airport capacity by the alleviation of wake vortices caused by aircraft wings during takeoff and landing. This invention produces rapid variations in the position of each vortex by using an active flap that moves span-wise back and forth along the outboard section of a wing. Rapidly moving the flap back and forth in a slot at the appropriate frequency will cause the vortex emanating from each wing to oscillate, resulting in interaction between the two vortices and subsequent destruction much earlier than it would occur naturally.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

Figure 1:
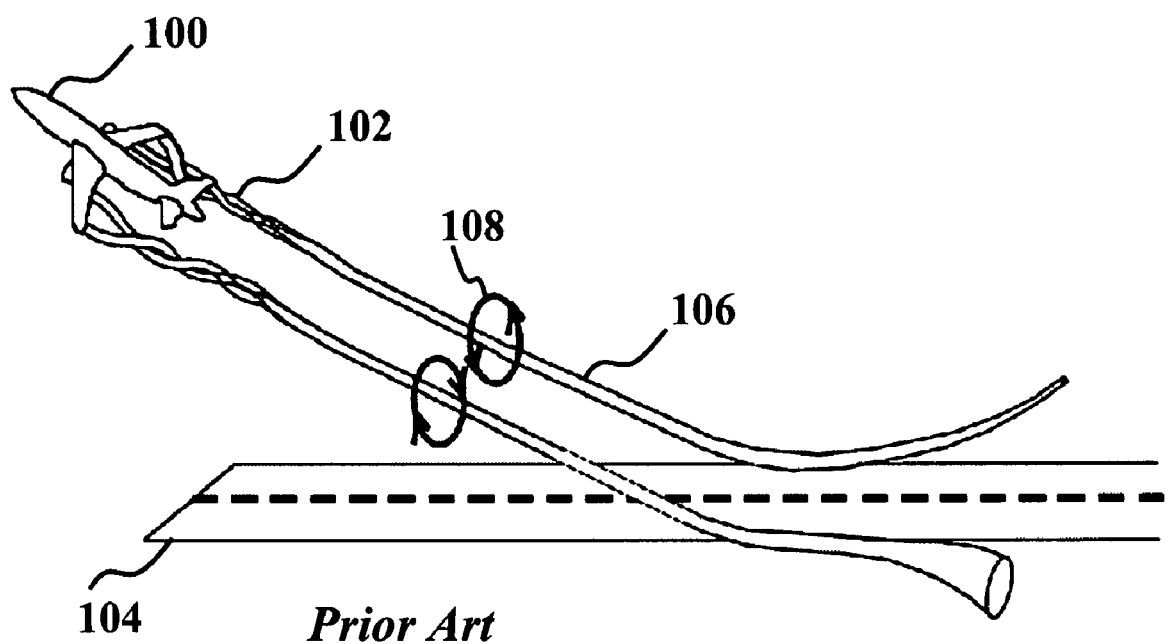
FIG. 1 shows a perspective view of a fixed-wing aircraft generating wake vortex hazards upon lift off from a runway.

FIG. 1 shows a perspective view of a typical fixed-wing aircraft 100 generating a circulation 102 in the air flow in which it travels through as it lifts off from an airport runway 104. This circulation 102 results in discrete trailing vortices 106 that extend far behind the generating aircraft 100. For large aircraft 100, these trailing vortices 106 tend to be strong and persistent, such that they can pose a serious threat to any aircraft 100 that may encounter them. This problem is referred to as the wake vortex hazard, where the trailing vortexes 106 have a rotation pattern 108 with a downwash component and an upwash component, depicted by up and down arrows in the drawing.

The Federal Aviation Administration (FAA) has implemented a set of rules designed to prevent wake vortex hazard encounters resulting from the large fixed wing aircraft 100, such as a jumbo jet. The rules include mandatory spacing between aircraft 100 operating near airports, causing airport capacity to be significantly limited. With the introduction of ever larger passenger aircraft 100, the problem has become much more urgent. The strength of the vortex hazard is directly related to the weight of the aircraft 100, where it is linearly proportional to lift, and inversely proportional to aircraft 100 velocity. At take-off, the required lift is particularly large due to the amount of fuel being carried by the aircraft 100 at that time, whereby strengthen the vortex hazard generated and magnify the problem. The trailing vortices 106 created by the aircraft 100 are counter-rotating 108, thus, in the absence of any other velocity field, they advect each other downward and slightly forward (depending on the angle of ascent). Once they approach the ground, they tend to move apart from each other horizontally. These vortices 106 can be dangerous to other aircraft 100 entering or leaving the airspace, where trailing vortices 106 can be extremely stable and have long life-spans. This is especially true on calm days with low atmospheric turbulence. Further, the rate of climb of most commercial aircraft 100 shortly after take-off tends to be quite high where, after a short amount of time, an aircraft 100 may achieve an altitude so high that its vortices 106 will not have reached the ground before another aircraft 100 takes off on a different flight path that intersects those vortices 106. Some of the incidents resulted in loss of life, while others caused the pilot to have to make drastic control surface deflections in order to land or take off safely. Further, crosswinds on runways 104 can easily cause a vortex 106 to linger, where the vortex 106 would otherwise roll away from the runway. The current rules at airports stipulate minimum distances between consecutive aircraft 100 taking-off and landing on their runways 104, where a typical matrix of required spacing is shown in Table 1. The size designations are based on maximum take-off weight, where "small" is less than 41,000 lbs, "large" is between 41,000 and 255,000 lbs, and "heavy" is greater than 255,000 lbs. This table gives the required spacing between aircraft 100 operating on a single runway 104 in instrument flight rules (IFR) conditions. Other factors can make the rules even more prohibitive, for example, an airport in IFR conditions has two parallel runways 104 that are less than 2,500 feet apart laterally, the airport cannot treat those runways independently and is effectively reduced to one runway.

TABLE 1

Spacing matrix given in nautical miles for IFR conditions on a single runway.

| Leader | Follower | | |
|---|---|---|---|
| | Small | Large | Heavy |
| Small | 3 | 3 | 3 |
| Large | 4 | 3 | 3 |
| B757 | 5 | 4 | 4 |
| Heavy | 6 | 5 | 4 |

The spacing rules currently in place are based on worst case scenarios. The rules work because they are grossly conservative allowing far more distance than should usually be required, whereby they allow adequate time for the effect from the vortices 106 to dissipate such that if a vortex 106 encounter occurs, the effect on the follower would be mild.

Figure 2:
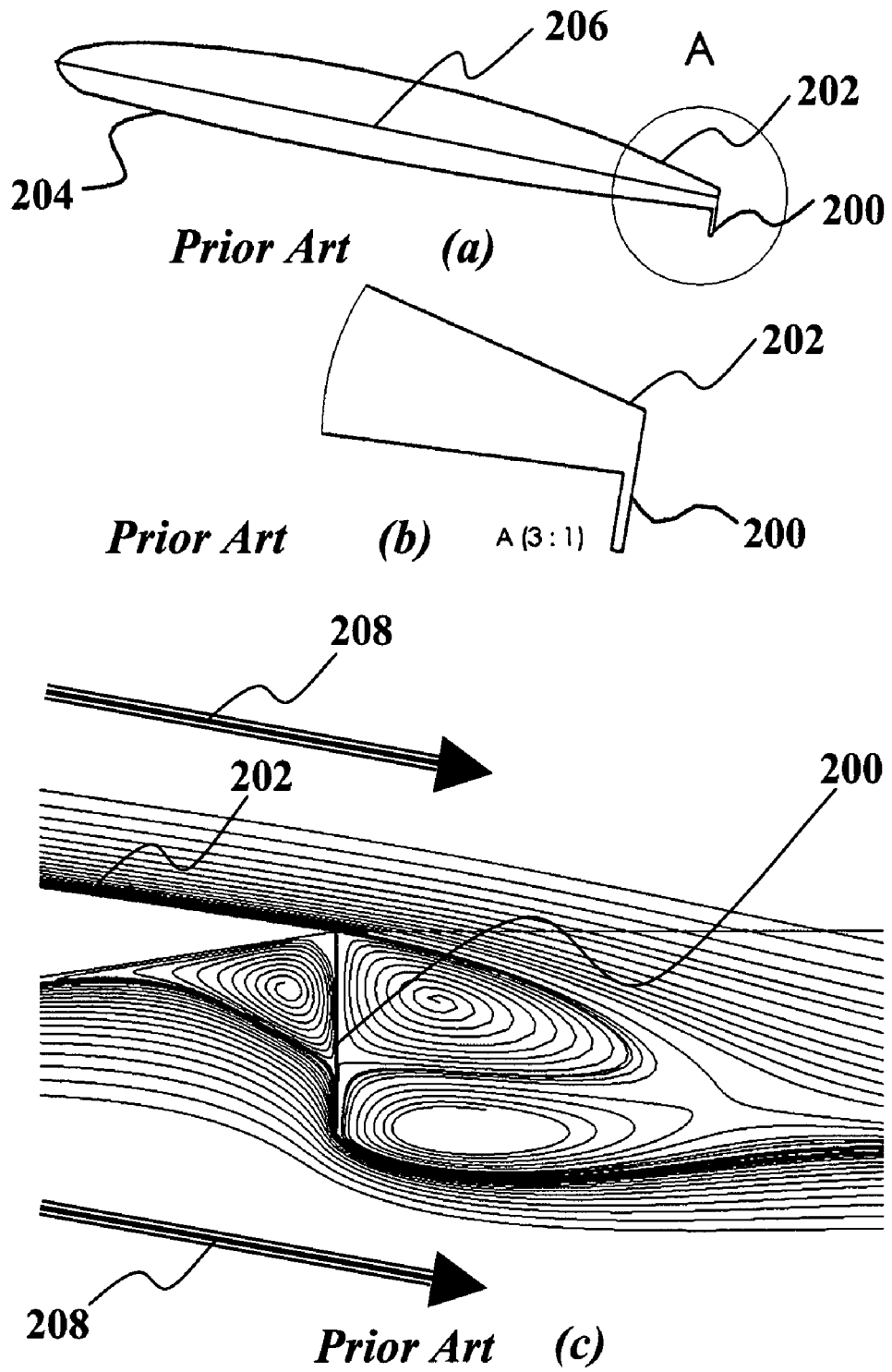
FIGS. 2a-2c show planar views of a prior art blunt Gurney flap vertical actuator at the trailing edge of an aerodynamic surface.

The current invention is a wake vortex alleviator that perturbs the wake vortex in real-time at the origin of the vortex on the wing. The main difficulty in achieving a active wake alleviation strategy is in finding an practical way to perturb the trailing vortices. The strategy must perturb them in real-time at an appropriate frequency without significantly changing the total lift experienced by the wing. FIGS. 2a-2c show planar side views of an aircraft Gurney flap 200 at the trailing edge 202 of an aerodynamic surface 204. An aircraft Gurney flap 200 is a small tab, approximately 1-2% of a wing chord length 206, placed at the trailing edge 202 of an airfoil 204 oriented perpendicular to the airflow 208. It has been shown that aircraft Gurney flaps 200 are capable of significantly increasing the section lift coefficient of an airfoil 204 (>10%) without incurring a large increase in drag. They do this by effectively changing the chamber of the airfoil 204, thereby increasing the circulation about it, as shown in FIG. 2c. Since Gurney flaps 200 are small, they accomplish this while remaining inside the airfoil boundary layer. Gurney flaps 200 can run along the entire span (not shown) of an aerodynamic surface 204, or they can be segmented and placed along only certain span-wise portions.

Figure 3:
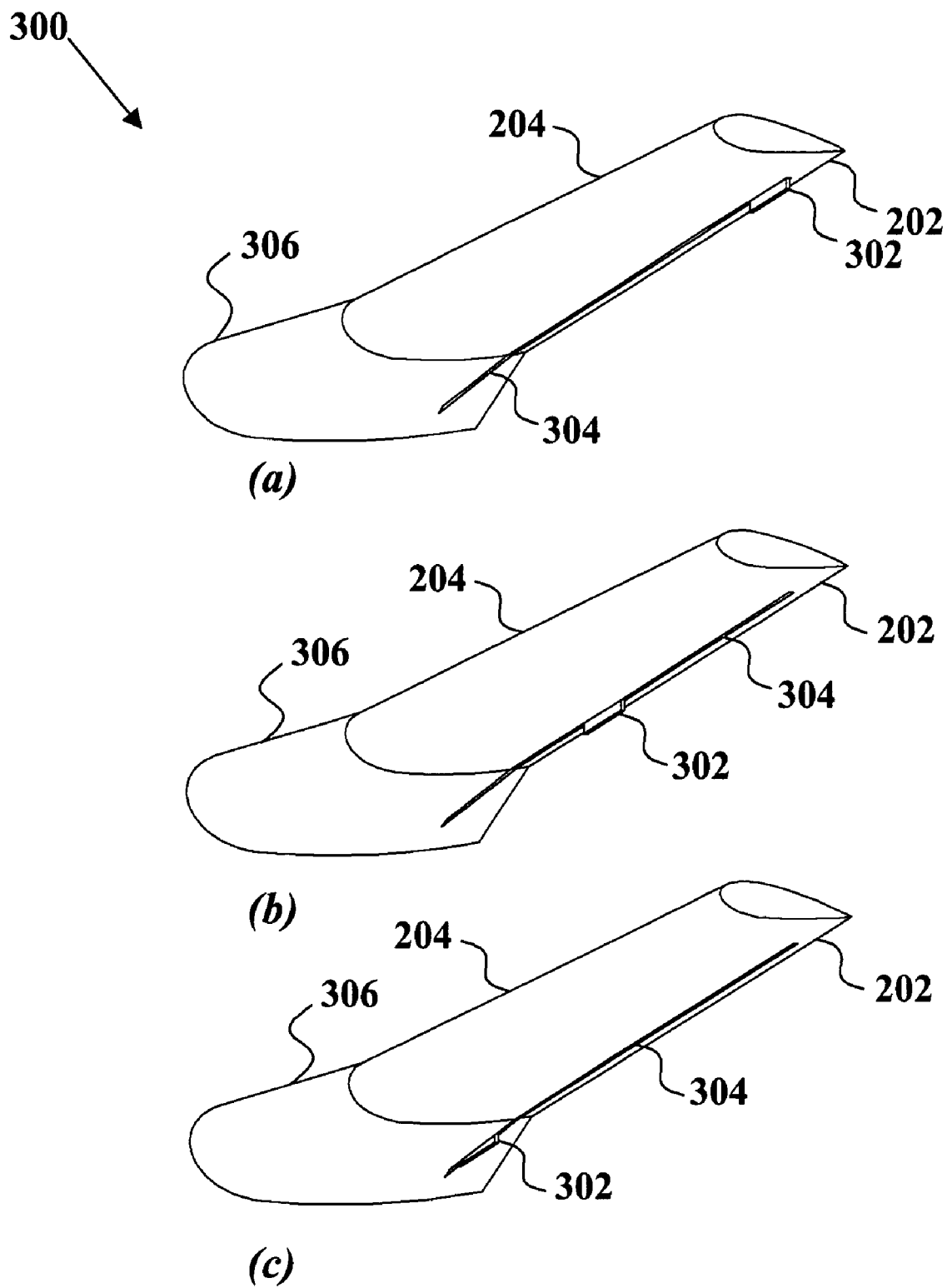
FIGS. 3a-3e show an active translating flap integrated to a slot of an airfoil according to the current invention.
Figure 3:
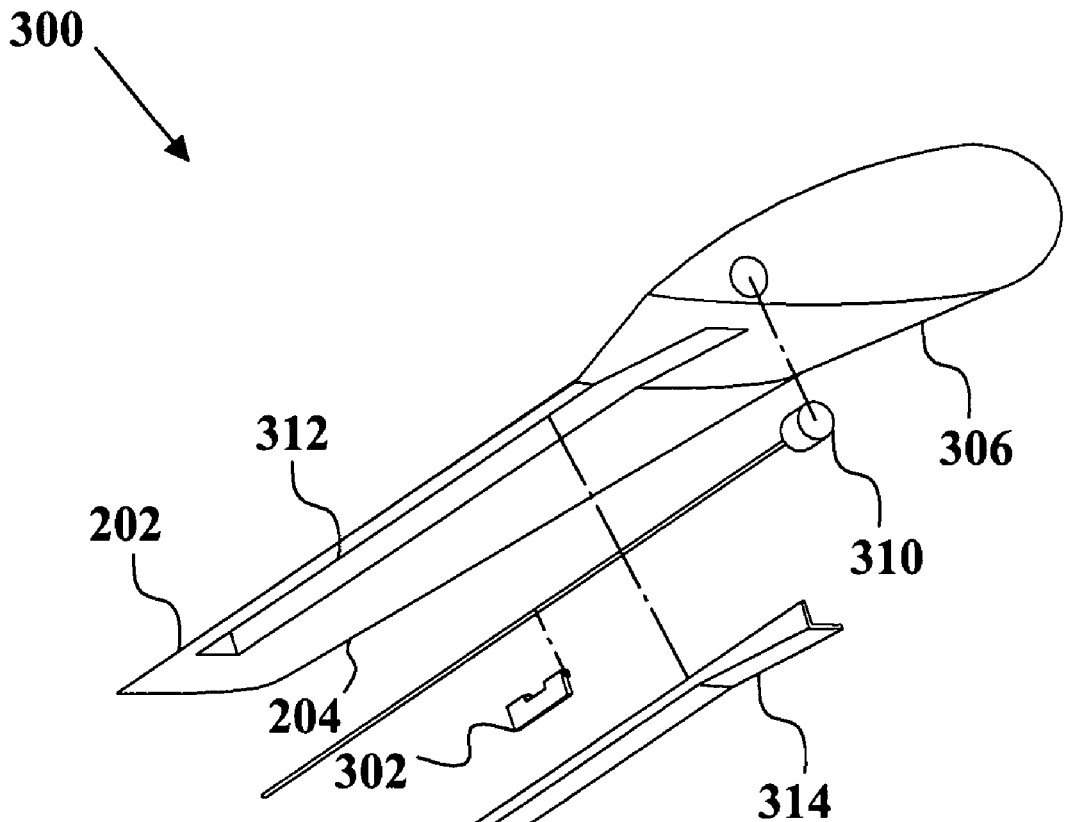
Figure 3:
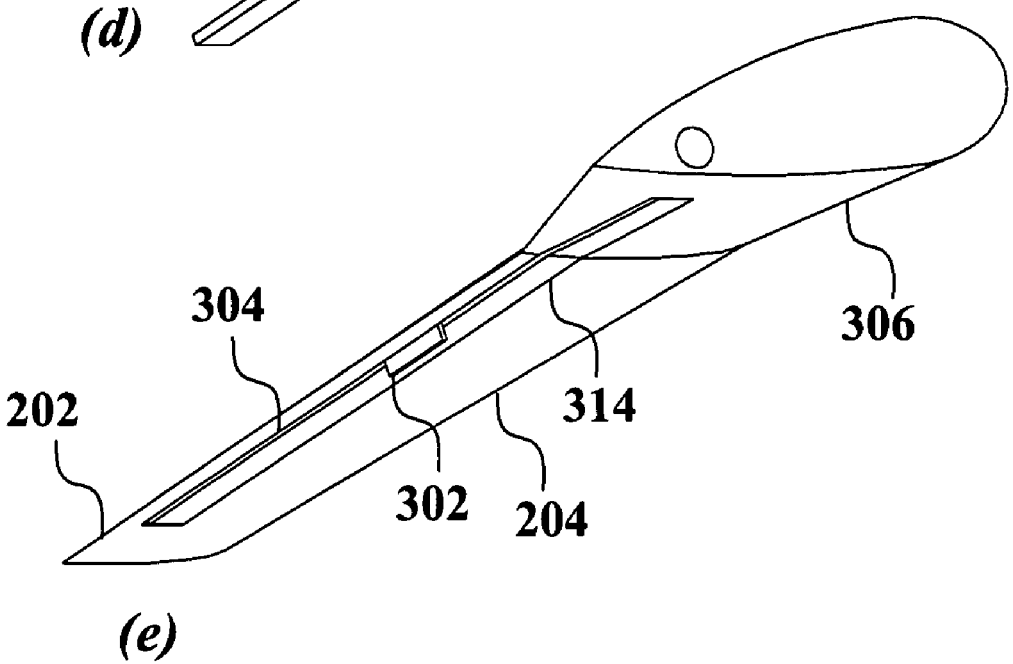

Referring to FIGS. 3a-3e, the present invention is a wake vortex alleviator 300 integrated to an aerodynamic surface 204 (or wing) of an aircraft 100. The invention includes a translating flap 302, for example a translating Gurney flap, integrated to a slot 304 in the aerodynamic surface 204. The flap 302 is positioned in air (not shown) moving across the aerodynamic surface 204 using an actuator (see FIG. 3(d)) for translating, positioning and stowing the flap 302. The slot 304 is generally transverse to a chord line 206 of the aerodynamic surface 204 and positioned near a trailing edge 202 of the aerodynamic surface 204. The flap 302 translates along the slot 304 to induce early destruction of the wake vortex 106 created by the aerodynamic surface 204. In FIG. 3(a), the flap 302 is shown deployed near the tip of the aerodynamic surface 204, FIG. 3(b) shows the flap 302 deployed along the span of the aerodynamic surface 204, and FIG. 3(c) shows the flap positioned into the root 306 of the aerodynamic surface 204, where in this embodiment, the translating flap 302 is stowed in the root 306 and out of the airflow when not deployed. FIG. 3(d) shows an exploded perspective view of the wake vortex alleviator 300, where the alleviator 300 has an aerodynamic surface 204 for holding an actuator 310 to translate, position and stow the flap 302. In on embodiment the actuator 310 and flap 302 can be positioned in a cavity 312 of the aerodynamic surface 204, with a cavity cover 314 that attaches to the aerodynamic surface 204, where the cover 314 is sized to create the slot 304 in which the flap 302 translates.

Some alternate embodiments or the wake vortex alleviator 300 include one where the flap 302 may be located on the low-pressure side (not shown) or on the high-pressure side of the aerodynamic surface 204. Further, in another embodiment, the flap may have a length that is up to ½ of a wing half span (not shown), where the slot 304 may be at least two times the length of the flap. Further the flap 304 can have an effective height that varies (not shown) along the slot 304, where the effective height may be up to 5-percent of a length of the chord line 206.

Figure 4:
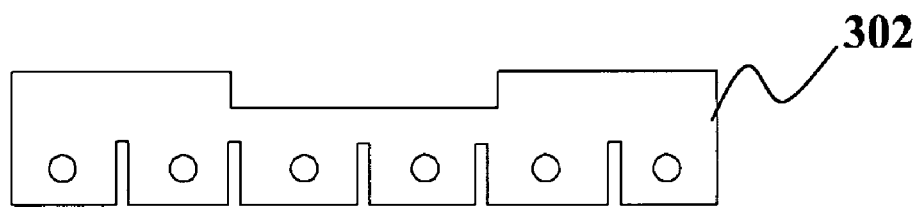
FIG. 4 shows a planar view of a translating flap having features cut there through according to the current invention.

In one embodiment the flap 302 may have holes, slices or features cut there through as shown in FIG. 4.

In a further embodiment of the invention, the translation can be an oscillation along the slot 304. Additionally, the oscillation may be a response-oscillation actuated according to variations in lift in the aerodynamic surface 204, where the lift variations may be wind gusts. According to another aspect of the invention, the trailing edge 202 of the aerodynamic surface 204 may be a sharp edge or a blunt edge (not shown).

Figure 5:
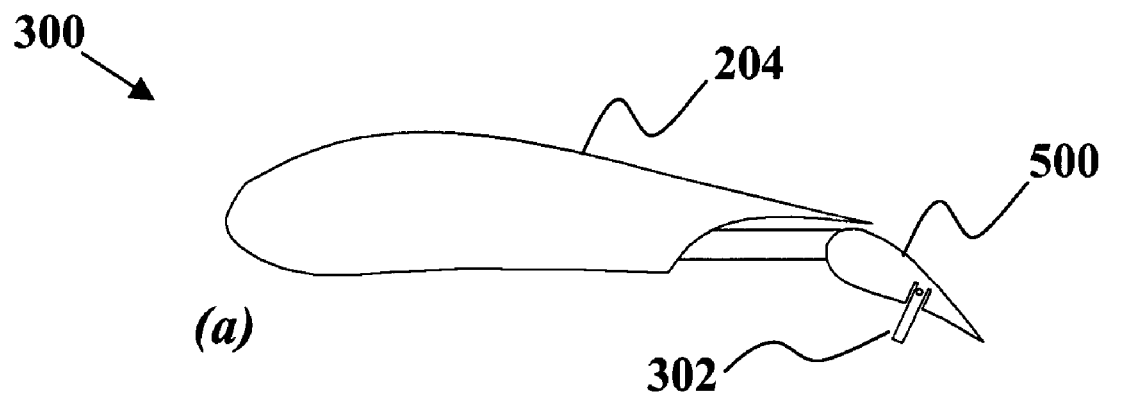
FIGS. 5a-5c show planar views of different wake vortex alleviators configured to different aerodynamic surfaces according to the current invention.
Figure 5:
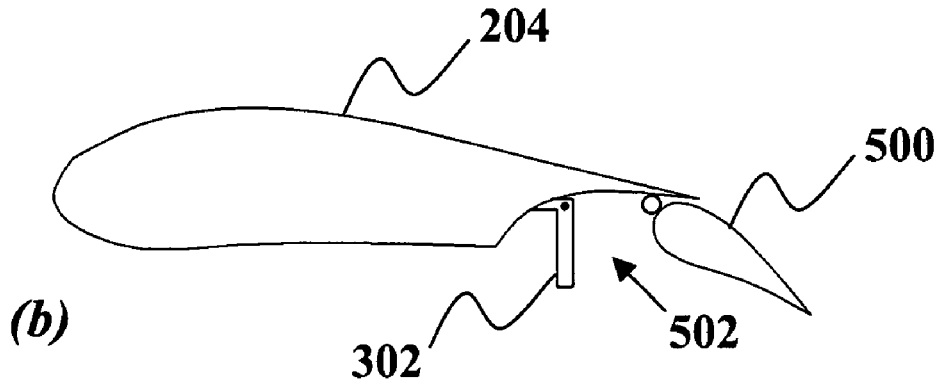
Figure 5:
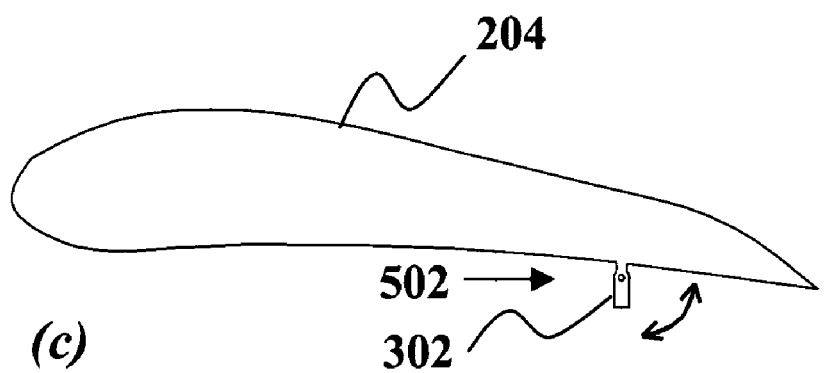

Common to many large aircraft 100 is an aerodynamic surface 204 that can have one or more lifting surfaces, such as a Fowler flap 500 shown in FIG. 5a, where according to one embodiment of the invention, translating flap 302 of the wake vortex alleviator 300 may be positioned on the additional lifting surface such as the Fowler flap 500. A Fowler flap 500 slides backwards before hinging downwards, thereby increasing both camber and chord 206, creating a larger wing surface better tuned for lower speeds. In another embodiment of the invention, the slot 304 may be a void 502 as shown in FIG. 5b in the aerodynamic surface 304. The void 502 may be an open span between the trailing edge 202 and a lifting surface, such as a Fowler flap 500 deployed from the trailing edge 204. In another aspect, the void 502 may be a space of air that is positioned away from the aerodynamic surface 204, where for example, the actuator 310 and flap 302 are stowed into the aerodynamic surface 204 when the flap 302 is not in use. In another embodiment of the invention, the stowage of the flap 302 includes a pivoting flap that rotates into the slot and out of the airflow when not in use, as shown in FIG. 5c. Further, as shown in FIG. 3(c), the stowage of the flap 302 can be a hidden slot 304 in the root 306 of the aerodynamic surface 204, where the flap 302 moves into the hidden slot 304 and out of the airflow.

In another aspect of the invention, the actuator 310 is selected from a group of actuators that include a linear ball screw, a worm drive, a scotch yoke, a crank arm and a solenoid (not shown).

In another embodiment, the flap 302 can be a pair of the flaps 304 mounted on the aerodynamic surface 204 located on each side of an aircraft 100. In one aspect, the flaps 302 are mounted symmetrically on the aerodynamic surfaces 204 located on each side of an aircraft 100. According to one aspect of the invention, the flap 302 controls the yaw, roll or pitch of the aerodynamic surface 204. In another aspect of the invention, the aerodynamic surface 204 further includes an extended flutter boundary (not shown).

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. One variation includes use of the translating flap on helicopter rotors to manage rotor resonance. Another variation includes using the translating flap on jet engine fan blades to reduce noise or improve performance. Another variation includes using translating flaps on wind turbines for load management.

All such variations are considered to be within the scope and spirit of the present invention as defined by the following claims and their legal equivalents.

What is claimed is:

1. A wake vortex alleviator on an aerodynamic surface comprising:
 a. a translating flap integrated to a slot in said aerodynamic surface and positioned in air moving across said aerodynamic surface, wherein said flap is a Gurney flap; and
 b. an actuator for translating, positioning and stowing said flap, wherein said slot is generally transverse to a chord line of said aerodynamic surface and positioned near a trailing edge of said aerodynamic surface, whereby said flap translates along said slot to induce early destruction of said wake vortex created by said aerodynamic surface.

2. The wake vortex alleviator of claim 1, wherein said flap is on a low-pressure side or on a high-pressure side of said aerodynamic surface.

3. The wake vortex alleviator of claim 1, wherein a length of said flap is up to ½ of a wing half span.

4. The wake vortex alleviator of claim 1, wherein said flap has an effective height that varies along said slot.

5. The wake vortex alleviator of claim 4, wherein said effective height is up to 5-percent of a length of said chord line.

6. The wake vortex alleviator of claim 1, wherein said flap comprises holes, slices or features cut therethrough.

7. The wake vortex alleviator of claim 1, wherein said slot is a void in said aerodynamic surface.

8. The wake vortex alleviator of claim 7, wherein said void is an open span between said trailing edge and a lifting surface deployed from said trailing edge.

9. The wake vortex alleviator of claim 7, wherein said void is a space of air removed from said aerodynamic surface, whereby said actuator is deployed in said aerodynamic surface when said flap is stowed.

10. The wake vortex alleviator of claim 1, wherein said aerodynamic surface comprises one or more lifting surfaces of a wing.

11. The wake vortex alleviator of claim 10, wherein said lifting surface is a Fowler flap.

12. The wake vortex alleviator of claim 1, wherein said translation is an oscillation along said slot.

13. The wake vortex alleviator of claim 12, wherein said oscillation is a response-oscillation actuated according to variations in lift in said aerodynamic surface, wherein said lift variations are wind gusts.

14. The wake vortex alleviator of claim 1, wherein said trailing edge is a sharp edge or a blunt edge.

15. The wake vortex alleviator of claim 1, wherein said slot is at least two times the length of said flap.

16. The wake vortex alleviator of claim 1, wherein said actuator is selected from a group comprising a linear ball screw, a worm drive, a scotch yoke, a crank arm and a solenoid.

17. The wake vortex alleviator of claim 1, wherein said flap is a pair of said flaps mounted on said aerodynamic surface located on each side of an aircraft.

18. The wake vortex alleviator of claim 17, wherein said flaps are mounted symmetrically on said aerodynamic surfaces located on each side of an aircraft.

19. The wake vortex alleviator of claim 1, wherein said flap stowage comprises a pivoting flap that rotates said flap into said slot and out of said airflow.

20. The wake vortex alleviator of claim 1, wherein said flap stowage comprises a hidden slot in a root of said aerodynamic surface, whereby said flap moves into said hidden slot and out of said airflow.

21. The wake vortex alleviator of claim 1, wherein said flap controls a yaw, a roll or a pitch of said aerodynamic surface.

22. The wake vortex alleviator of claim 1, wherein said aerodynamic surface further comprises an extended flutter boundary.

* * * * *